G. W. SCOTT.
QUICK DETACHABLE DUST CAP.
APPLICATION FILED MAR. 18, 1920.
1,399,405.
Patented Dec. 6, 1921.
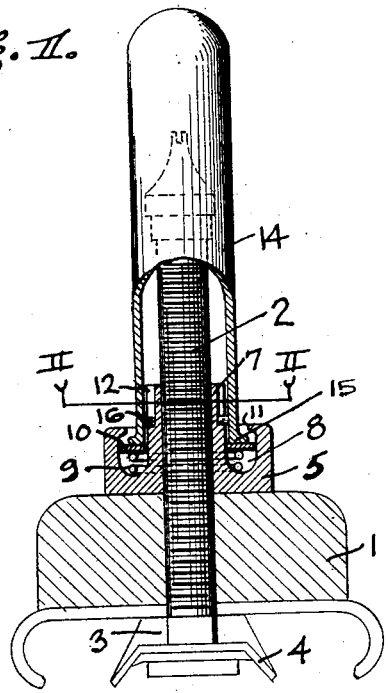
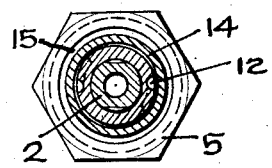
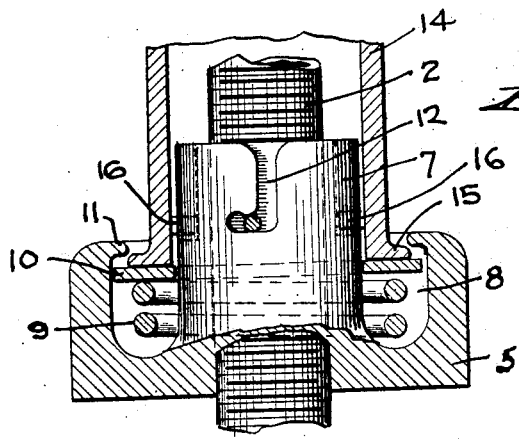
INVENTOR
GEORGE W. SCOTT
BY
Lincoln Johnson
ATTORNEY

UNITED STATES PATENT OFFICE.

GEORGE W. SCOTT, OF SANTA ROSA, CALIFORNIA.

QUICK-DETACHABLE DUST-CAP.

1,399,405.

Specification of Letters Patent.

Patented Dec. 6, 1921.

Application filed March 18, 1920. Serial No. 366,776.

*To all whom it may concern:*

Be it known that I, GEORGE W. SCOTT, a citizen of the United States, and a resident of the city of Santa Rosa, county of Sonoma, State of California, have made a new and useful invention—to wit, Improvements in a Quick-Detachable Dust-Cap; and I do hereby declare the following to be a full, clear, concise, and exact description of the same.

This invention relates particularly to dust caps of the quick detachable type for the valve stems of automobile tire tubes.

An object of my invention is to provide a tubular inclosing member that will completely surround the projecting valve stem and by the new and novel construction embodied herein permit the cap to be quickly attached or detached to the stem by a simple turn or axial rotation, relative to the stem, eliminating the necessity for internally threading the stem caps and screwing the same onto the stem, as is the present practice.

A further object is to provide a dust cap without external projections or depressions and which will generally be free from objectional and dangerous elements of construction.

In this specification and the annexed drawings, the invention is illustrated in the form considered to be the best, but it is to be understood that the invention is not limited to such form, because it may be embodied in other forms; and it is also to be understood that in and by the claims following the description it is desired to cover the invention in whatsoever form it may be embodied.

In the following one sheet of drawings—

Figure 1 represents a sectional view taken through the felly of a wheel with my invention applied to the projecting stem of the tube valve.

Fig. 2 is a sectional view taken through Fig. 1 on the line II—II.

Fig. 3 is an enlarged sectional view partly in side elevation of a valve stem and nut constructed in accordance with my invention.

In detail the construction illustrated in the drawings includes the felly 1 of a wheel of an automobile having the threaded stem 2 of the tire tube passing therethrough. The stem according to standard methods of construction is provided with a lock nut 3, adjacent the metallic saddle 4 which is clamped rigidly against the wall of the inner tube, and by reason of the fact that this application is not concerned with the particular structure of the connection between tube and stem the same is only mentioned in so far as to call attention to the possibilities of adapting my improvement to standard tube stems. As in usual practice the stem 2 is firmly positioned on the felly by the hollow lock nut 5, screwed thereon and frictionally engaging the felly. The nut 5 may be either shaped hexagonally for wrench engagement, and is further provided with the integral, annular projection or shoulder 7 on its outer face. Adjacent the projection 7 and within the body portion 5, the nut is milled or routed out to form an annular recess or depression 8, into which is adapted to be placed the resilient member or compression coil spring 9 and the annular washer 10, the purpose of which will be hereinafter described in detail. The recess 8 has the projections or embossments 11 struck out from its outer upper edge for engaging the washer and thus retaining the spring within the recess.

The shoulder portion 7 of the nut 5 is provided with one or a plurality of angularly disposed depressions 12, around its periphery which may be arranged at any desired position or angle. In the present instance the grooves 12 are L shaped, but it would be clearly within the purview of the invention to modify the depression to any form best calculated to rigidly hold the dust cap 14 thereon. The partially closed tubular inclosing member 14 is provided with an open flared end having the shoulder beading 15 therearound, contiguous to which one or a plurality of inwardly projecting arms 16 are secured and which are adapted to enter companion angularly disposed grooves 12. By means of a quarter turn or twist, axial rotation will be imparted to the cap, sufficient to place the projections within the grooves and to hold the cap firmly on the nut. In Fig. 3 it will be seen that when the cap is in the locked position on the stem the shoulder 15 will bear against the washer 10 to compress the resilient spring 9, which action serves to frictionally deter the cap from free rotation.

The dust cap is applied to the nut on the threaded stem by placing the same thereover until the internal projections 16, formed within the cap, register with the companion grooves 12. On pressing the same down the annular shoulder 15 on the cap, thereupon engages the washer 10 upheld by the coil spring 9, the tension of which must be overcome before the cap can be rigidly positioned. By pressing down on the cap and compressing the spring 9, the pins 16 will be brought into register with the lower recess of the grooves 12 where the cap will be held from further rotation by the frictional contact of the outwardly expanding spring. To remove the cap it is only necessary to press inward against the tension of the spring and to rotate the cap until its inner projections register with the vertical grooves of the L shaped depressions.

The dust cap thus described can be quickly attached or detached from the stem of the tube and overcomes many apparent disadvantages inherent in the usual threaded type of dust cap.

Having thus described my invention, what I claim and desire to secure by Letters Patent is:—

1. A device such as described comprising in combination the threaded valve stem of a pneumatic tire; a nut in threaded engagement with said stem having an exterior portion adapted for wrench engagement; a concentric shoulder projecting from said nut; angular depressions formed in the projecting shoulder and spaced from the face of said nut; an annular depression in said nut surrounding the base of said shoulder; inwardly extended projections formed within said annular depression; a washer within said depression and a spring confined within said depression between the base thereof and said washer, and a valve cap having internal projections therein adapted to inclose said stem and engage the angular depressions in said projecting shoulder whereby the end of said cap will engage the spring tensioned washer in the depression to fixedly hold the cap in position on the nut.

2. A device of the kind described comprising a nut adapted for threaded engagement with a valve stem and having an exterior portion shaped for engagement by a wrench, a sleeve projecting from said nut, bayonet slots formed in said sleeve and spaced from the face of the nut, a spring surrounding said sleeve, a washer riding on said spring the nut being formed with portions to inclose said spring and inturned at the top to retain said washer, a cap adapted to fit said sleeve and inclose the valve stem said cap having internal projections to engage the bayonet slots and to permit the lower edge of the cap to engage and depress the spring pressed washer, whereby when the cap is partially rotated the coaction between the bayonet slots on the sleeve the projections on the cap and the tension of the spring will hold the cap in position.

3. In combination with a stem, of a sleeve surrounding said stem and having a plurality of bayonet slots, a washer yieldably mounted upon said sleeve, a tubular casing concentrically disposed in spaced relation to said sleeve and formed to provide means to limit the movement of said washer under the influence of said yieldable means in one direction, a cap designed to receive said stem, pins carried by said cap and adapted to be positioned within said slots for the purpose specified.

In testimony whereof, I have hereunto set my hand at San Francisco, California, this 13th day of March, 1920.

GEORGE W. SCOTT.

In presence of—
JAMES E. SCOTT,
LINCOLN V. JOHNSON.